United States Patent [19]

Teissier

[11] 4,294,424

[45] Oct. 13, 1981

[54] SUCTION GRIPPING DEVICE

[76] Inventor: Jacques Teissier, 18, rue Gustave Flaubert, Rueil-Malmaison, France, 92500

[21] Appl. No.: 57,634

[22] Filed: Jul. 16, 1979

[30] Foreign Application Priority Data

Jul. 20, 1978 [FR] France ................................ 78 21554

[51] Int. Cl.³ ........................ A45D 42/14; F16B 47/00

[52] U.S. Cl. ................................ 248/362; 248/206 R; 248/DIG. 10; 294/64 R; 279/3

[58] Field of Search ................... 248/362, 363, 206 R, 248/DIG. 10; 294/64 R; 279/3

[56] References Cited

U.S. PATENT DOCUMENTS

| | | | |
|---|---|---|---|
| 1,714,422 | 5/1929 | Hanson | 294/64 R |
| 2,066,773 | 1/1937 | Felice | 294/64 R |
| 2,147,907 | 2/1939 | MacChesney | 248/363 |
| 2,229,375 | 1/1941 | Eggleston | 294/64 R |
| 2,916,184 | 12/1959 | Hartley et al. | 220/69 |
| 2,929,653 | 3/1960 | Hund et al. | 294/64 R |
| 2,936,139 | 5/1960 | Lindstrom | 248/206 R |
| 3,863,568 | 2/1975 | Frederick | 248/362 |

FOREIGN PATENT DOCUMENTS

| | | | |
|---|---|---|---|
| 178580 | 5/1954 | Austria | 294/64 R |
| 622680 | 5/1949 | United Kingdom | 248/DIG. 10 |
| 667733 | 3/1952 | United Kingdom | 248/206 R |

*Primary Examiner*—Victor N. Sakran

[57] ABSTRACT

The present invention concerns a suction type gripping device wherein the skirt of the suction-grip is constituted by a deformable pocket of overall annular shape containing particles, the said skirt being provided with means to reduce pressure within the pocket, thereby pressing in the walls of the pocket under higher external pressure to closely conform the pocket with the surface of the article to be gripped, and then retaining that gripping conformity by fixing the said particles in that position after the said skirt has been placed in conforming surface contact with the article to be gripped.

6 Claims, 1 Drawing Figure

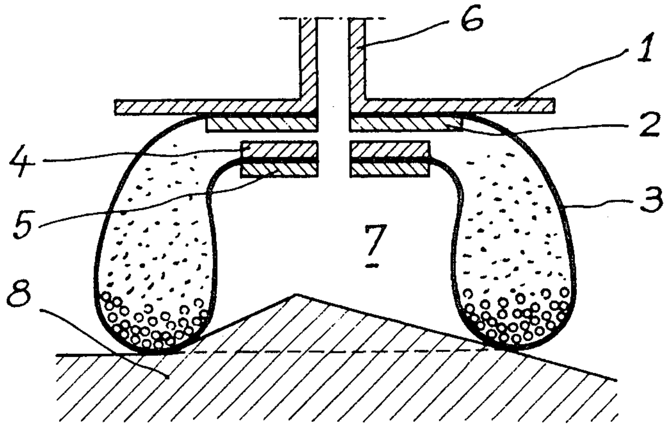
6
1
2
4
3
5
7
8

SUCTION GRIPPING DEVICE

The present invention relates to a gripping device operating by suction effect.

Suction gripping devices have been known and used for a long time now; the suction-grip is constituted by a skirt, made from a deformable material such as rubber, which is applied on one surface of the part to be gripped by suction, said skirt defining between itself and the said surface, a space inside which a reduced pressure is created. Due to this reduced pressure, the suction means adheres more or less strongly to the said surface and the said part may be handled through the said suction grip.

The difficulties encountered when using suction-grips are essentialy due to the skirts which adapt more or less well to the surface of the part to be gripped; the present invention therefore relates to an improved skirt for a suction-grip and to the suction-grip proper, using such improved skirt.

The skirt according to the invention is characterized in that it is constituted by a deformable elastic pocket, substantially annular in shape, and containing particles preferably with a certain density, and by at least one means permitting to reduce pressure within the pocket, thereby pressing in the walls of the pocket under higher external pressure to closely conform the pocket with the surface of the article to be gripped, and then retaining that gripping conformity by fixing the said particles in that position when the wall of the said pocket has been brought in conforming surface contact with the part to be gripped.

The annular shaped elastic pocket constituting the skirt and containing the particles, can form a single cavity or be radially divided into several separate chambers; the said division generally allows a more uniform distribution of the particles inside the pocket.

Amongst the means that can be used to fix the particles in said position, are:

the creation of a reduced pressure, with respect to the outside pressure, inside the pocket, the use of magnetic particles which are fixed in said position by means of a magnetic field, an alteration of the state of a material which can be found on the said particles, such as for example, freezing the water soaking sand particles thereby, fixing the particles in said position by ice as well as combinations of these means.

The preferred fixing means however is the creation of a reduced pressure.

The suction grip according to the invention, and using the said skirt, consists besides the said skirt, in means permitting to create a certain reduced pressure in the space situated between the surface of the part to be gripped and on which is applied the said skirt, and the skirt proper.

And thus according to the invention, it will be possible to create a reduced pressure inside the skirt with a view to fixing the particles in said position contained therein, and a reduced pressure in the space defined by the ring-shape of the skirt and situated between the surface of the part to be gripped and the skirt. These two reduced pressures may be identical or different and they can be produced simultaneously or with a time interval. It is deemed advisable to first produce a suitable reduced pressure inside the skirt and then the reduced pressure in the aforesaid space.

The invention will be better understood with reference to the accompanying FIGURE showing, in cross-section, a non-restrictive embodiment of the gripping device according to the invention.

In said FIGURE:

1 is a rigid plate,

2 is another rigid plate which can be tightened on said plate 1 so as to wedge between 1 and 2 the edges of an opening provided in an hollow annular tube 3 made of rubber, the edges of another opening provided in the same rubber annular tube, opposite the first opening, are wedged between two other rigid plates 4 and 5; said two plates 4 and 5 are secured to plate 2 so as to leave, between the faces opposite 4 and 2, a passage between 1 and 3 mm high approximately, in this way, the initial rubber annular tube takes the shape of a substantially annular tubular skirt; a filling of particles is placed in the skirt (between the two rubber walls) said particles may be of any type such as for example plastic balls; preferably, a certain quantity of lead balls will be used, as these will weigh down the device and help it somewhat to spread out when in contact with the surface of the part to be gripped and, for the remaining part of the inside volume, balls of expanded polystyrene; this particular embodiment is the one illustrated in the accompanying FIGURE, plates 1, 2, 3 and 4 are provided in their centre with an opening and a tube 6 which is connected to a blower unit adapted, as required, either to supply a certain pressure about the atmospheric pressure or to create a certain reduced pressure; the said blower unit (not shown on the FIGURE) is thus connected, by the tube 6, on the one hand, with the inside of the annular pocket 3 by the passage between the plates 2 and 4, and also with the space 7 which is provided, by the device according to the invention, between said device and the surface of the part to be gripped (diagrammatically shown in 8).

The device according to the invention operates as follows:

said device is brought into contact with the surface of the part to be gripped, with the blower means, a slight superatmospheric pressure is introduced inside the annular pocket and the space provided between the device and the said part, whilst maintaining the contact, so as to help the annular pocket to spread on the surface of the part to be gripped; it will be noted that this operation, although advantageous, may be omitted in many tests, then the action of the blower unit is reversed and said latter then becomes a suction means; said unit thus creates a certain reduced pressure, with respect to the atmospheric pressure, inside the annular pocket, which results in the said pocket coming into very close contact with the surface of the said part, and in the space situated between the said surface and the device, and fixing the particles confined therewithin in that position, the said part can then be raised with the said apparatus.

The device and its mode of operation as described hereinabove are not in any way limiting the present invention; indeed, it is possible to produce the annular pocket in many other ways that are equivalent; the essential part of the invention resides in the fact that the device has the overall shape of a suction-grip, that the exerted gripping force comes essentially from the pressure difference created in the space between the skirt of said suction-grip and the surface of the said part, using a device to this effect, and that the skirt of said suction-grip is constituted by a pocket, generally annular in shape, and with a soft wall, filled wth suitable particles, and in which pocket it is possible to create a certain reduced pressure with respect to the atmosphere, and if necessary, a certain overpressure.

The device according to the invention will be used preferably with air as fluid, but it can also be used with other fluids such as liquids for example.

For gripping and conveying parts of large dimensions it will be possible to use several devices according to the invention connected for example with the same blower unit and which can be suitably positioned on the said parts by way of any known devices.

What is claimed is:

1. A gripping device adapted when under reduced pressure to be brought into close gripping conformity with the surface of an object to be gripped, comprising, (a) a ring-shaped body deformable in any direction and having a head portion and a skirt portion, the skirt portion having walls of deformable material defining a hollow interior within the skirt, and defining an open space outside the skirt and within the ring;

(b) at least one means in the head portion communicating the hollow interior of the skirt with means for withdrawing fluid from the interior and reducing pressure within the interior to below the pressure outside the skirt;

(c) at least one means in the head portion communicating the open space with means for withdrawing fluid from the open space and reducing pressure within the space to below the pressure outside the ring when the skirt is in contact with an object to be gripped;

(d) a plurality of freely movable particles confined within the hollow interior of the skirt portion, and compelled to conform to any deformed configuration thereof adopted under reduced pressure within the interior of the skirt, and within the ring; and (e) the body walls of the skirt portion under such reduced pressure and higher external pressure conforming closely to the surface of an object to be gripped, and retaining and fixing the particles in such conformity, thereby firmly gripping the object while such reduced pressure continues.

2. A gripping device according to claim 1, comprising, in addition, means for reducing pressure within the interior of the skirt portion and within the space defined within the ring.

3. A gripping device according to claim 2 in which the means for reducing pressure is a suction pump.

4. A gripping device according to claim 1 in which the particles within the interior of the skirt comprise dense particles and light particles.

5. A gripping device according to claim 4 in which the dense particles are lead particles, and the light particles are expanded polystyrene particles.

6. A gripping device according to claim 1 in which the ring-shaped body is in the form of a tube, the tube having an outermost portion defining the skirt portion, and an innermost portion defining the head portion; the tubular walls of the head portion defining an annular opening communicating the hollow interior of the tube and the open space within the ring with the means for withdrawing fluid therefrom; and being confined between parallel plates to which the said tubular walls are sealed.

* * * * *